United States Patent [19]
Awaya et al.

[11] 4,226,274
[45] Oct. 7, 1980

[54] RUBBER TIRE WITH WEAR INDICATOR THEREIN

[76] Inventors: Herbert Y. Awaya, 3268 Kilihune Pl.; Ronald S. Hieda, 738 21st. Ave., both of Honolulu, Hi. 96816

[21] Appl. No.: 943,273

[22] Filed: Sep. 18, 1978

[51] Int. Cl.² .............................................. B60C 11/00
[52] U.S. Cl. .............................. 152/330 A; 152/209 R
[58] Field of Search ........... 152/209 R, 209 P, 330 R, 152/330 A; D12/134, 136, 137, 138, 140, 141

[56] References Cited
U.S. PATENT DOCUMENTS

| | | |
|---|---|---|
| 3,578,055 | 5/1971 | French .............................. 152/330 A |
| 3,653,422 | 4/1972 | French .............................. 152/330 A |
| 3,833,040 | 9/1974 | Bins ..................................... 152/330 |
| 3,929,179 | 12/1975 | Hines ................................. 152/330 A |

FOREIGN PATENT DOCUMENTS

| | | | |
|---|---|---|---|
| 1946286 | 3/1971 | Fed. Rep. of Germany ...... 152/330 A |
| 2314915 | 10/1974 | Fed. Rep. of Germany ...... 152/330 A |
| 448223 | 6/1936 | United Kingdom ................ 152/330 A |

*Primary Examiner*—John E. Kittle
*Attorney, Agent, or Firm*—Blum, Kaplan, Friedman, Silberman & Beran

[57] ABSTRACT

A rubber tire, suitable for automobiles, has a wear indicator embedded in the tread. The wear indicator, generally in the form of a letter K, provides a quantitative measure of the amount of tread remaining and signals when the tire is dangerously worn.

10 Claims, 6 Drawing Figures

RUBBER TIRE WITH WEAR INDICATOR THEREIN

BACKGROUND OF THE INVENTION

While most automobile drivers are well aware of the fact that a badly-worn tire can be dangerous, drivers may become careless and fail to devote the attention to the condition of the tires which is warranted. Accordingly, it would be desirable that tires give a clear indication as to when they are so badly worn that they have become dangerous. In addition, it would be desirable that an indication be provided in the event that the tires are being worn unevenly.

A number of wear indicators has been disclosed. However, such indicators fail to give a continuous and clear indication as to the amount of tread remaining. Moreover, they do not show a sudden transition at the point where it becomes imperative that the tire be replaced. Also, they generally fail to show where the tread wear is uneven, such unevenness in wear usually being due to faulty alignment of the wheels. As is evident then, a wear indicator which is clearly visible and gives a positive, quantitative indication as to the amount of tread remaining and which also shows whether the tire is being worn unevenly, is to be desired. The present invention is designed to meet these needs.

SUMMARY OF THE INVENTION

A rubber tire has embedded therein a wear indicator in the general form of a letter K. The normally-vertical back of the letter is embedded in the tire at a level such that when it becomes visible as the result of the tread above same being worn away, it is necessary that the tire be replaced. Also, if the back of the letter becomes visible at one edge of the tire then the appearance of a portion of the back of the letter is an indication that the tire is wearing unevenly, generally as the result of the wheel being misaligned.

The two diagonal arms of the letter are so disposed that they form with the part of the thread that makes contact with the road a triangle. Both the triangle and the back of the letter include a component which is visually distinguishable from the remainder of the tread of the tire. The length of the exposed side of the triangle serves as a quantitative measure of the remaining tread in the tire.

The component which makes both the triangle and the back of the letter K visually distinguishable from the rest of the tire may be a colored pigment or colored cord, in each case white being considered a color.

Accordingly, an object of the pertinent invention is a tire, including a wear indicator which provides a quantitative measure of the amount of tread remaining in the tire.

Another object of the present invention is a tire, including a wear indicator which, in section, has the shape of the letter K the span between the two diagonal arms serving as an indication of the quantity of tread remaining in the tire and the back of the K serving as a warning that the tire must be replaced.

A further object of the present invention is a tire including a wear indicator in which a colored line or strip serves as an indication of the amount of tread remaining in the tire.

Yet another object of the present invention is a tire including a wear indicator in which the measure of the wear remaining in the tire is shown by means of a colored pigment or colored tread.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
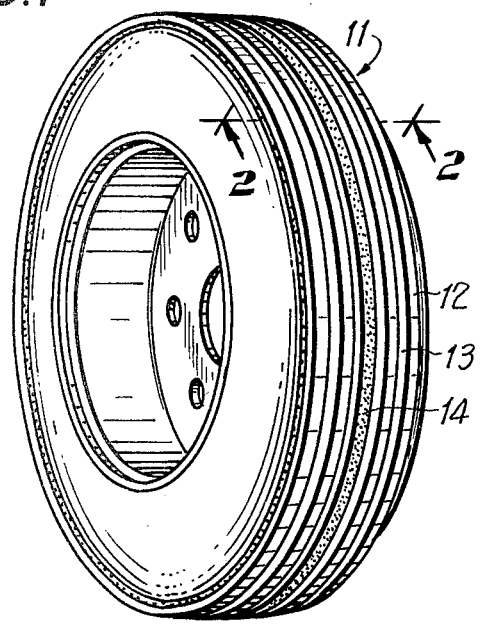
FIG. 1 is a perspective view of a tire, including a wear indicator in accordance with the present invention.
Figure 2:
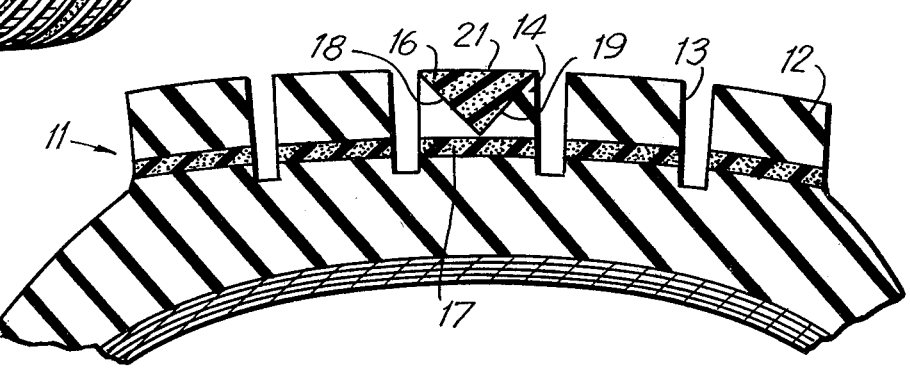
FIG. 2 is a view taken along the line 2—2 of FIG. 1.

A rubber tire, including a wear indicator, in accordance with the present invention, is shown in perspective view in FIG. 1, the portion of the tire which normally makes contact with the road, that is, the periphery of the tire being generally indicated by the reference numeral 11. The tread in the tire shown is in the form of strips 12, separated by grooves 13. The central strip 14, shown as shaded, embodies the wear indicator of the present invention. The nature of the wear indicator is more clearly shown in FIG. 2, which is a sectional view of FIG. 1, taken along the line 2—2 of FIG. 1. Strip 14 comprises a section 16 which includes a component which makes said section visually distinguishable from the remainder of the tire tread. In the embodiment of FIGS. 1 and 2, section 16 continues completely around the periphery of the tire. More deeply embedded in the tire is a section 17 which, except for the grooves, is essentially cylindrical. Considering only tread portion 14, portions 16 and 17, in section, have the form of a letter K, portion 17 being the normally-vertical back of the letter and the two diagonal arms 18 and 19 being the interfaces between portion 16 and the remainder of tread strip 14. A component is included in the tread to make portions 16 and 17 visually distinguishable from the remainder of the tread. This component may be a colored pigment or a colored tire cord or thread. For the purposes of the present invention, white is considered to be a color, since it is visually distinguishable from the remainder of tire tread which normally includes carbon black.

Figure 3:
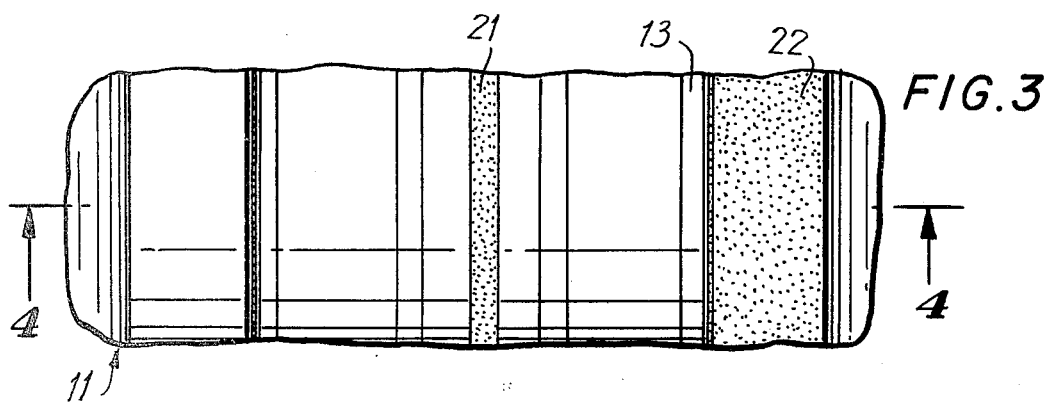
FIG. 3 is a partial view of the road-contact surface of the embodiment of FIG. 1.

In a new tire, as shown in FIGS. 1 and 2, the triangle which is formed by the arms 18 and 19 and the face 21 of the triangle 16 extends completely across tread strip 14. As the tread wears base 21 of the triangle becomes narrower as shown in FIG. 3. The width of strip 21 then serves as a quantitative measure of the remaining tread in the tire.

Figure 4:
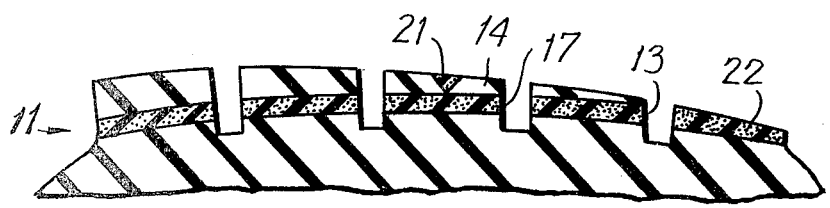
FIG. 4 is a view of line 4—4 of FIG. 3.

FIGS. 3 and 4 represent a tire which is being unevenly worn. The central portion of the periphery of the tire still has useful tread thereon. However, one edge of the periphery of the tire is more severely worn so that portion 22 of the back of the letter K is visible. Preferably, portions 17 and 22 of the letter are visually distinguishable from portion 21, so that they serve more effectively as an alarm that the tire must be replaced.

A variety of colored pigments are known to those skilled in the art which may be incorporated in a tire. Similarly, colored thread or cord may be incorporated in a tire as part of a wear indicator.

Figure 5:
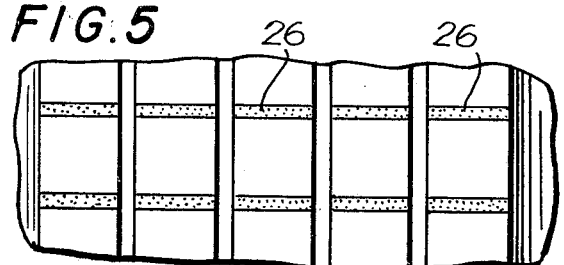
FIGS. 5 and 6 are partial views, in reduced scale, of further embodiments of the present invention.
Figure 6:
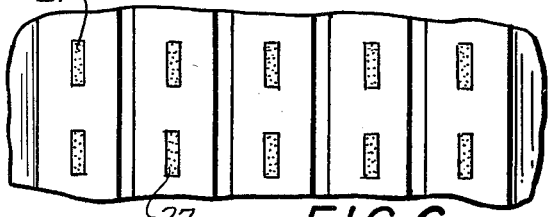

The embodiment of FIGS. 1-4 requires the incorporation of a substantial quantity of pigment or colored thread. The embodiments of FIGS. 5 and 6 are preferred as requiring smaller quantities of component to make the wear indicator visually distinguishable. In the embodiment of FIG. 5, K-shaped wear indicators which are thin relative to the lengths of the back and arms of said letter are incorporated around the periphery of the tire at spaced intervals. Preferably, indicators are incorporated not only around the tire but across the face of the tread, as shown in FIGS. 5 and 6. Moreover, the plane of the letter K may be parallel to the axis of the tire as shown in FIG. 5 or may be perpendicular to the axis of the tire as shown in FIG. 6.

As will be evident from the above, the tire of the present invention provides not only a quantitative measure of the wear remaining in the tire but an indication of uneven wear and also signals strongly when the tire must be replaced. In addition, embodiments are shown which require only a minimal addition to the normal components of the tire, thereby minimizing any effect on the cost of said tire.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A rubber tire, comprising a wear indicator in the general form of the letter K disposed within the tread of said tire, the vertical back of said letter being located at a region such as to indicate, on becoming visible as the result of wear of said tire that said tire is dangerously worn, the two diagonal arms of said letter being disposed for forming a triangle with the road-contact surface of said tire, said vertical back and the space between said arms including a colored component visually distinguishable from the remainder of the tread of said tire, whereby the length of the exposed side of said triangle at said surface of said tire serves as a quantitative measure of the remaining tread in said tire until the back of said letter becomes exposed.

2. The rubber tire, as defined in claim 1, wherein said wear indicator is disposed at the middle of that portion of the tire which makes contact with the road.

3. The rubber tire, as defined in claim 1, wherein said K extends in the axial direction beneath the tread of said tire for indicating dangerous uneven wear of said tire.

4. The rubber tire, as defined in claim 1, wherein said wear indicator includes colored pigment to make same visually distinguishable, white pigment being considered colored.

5. The rubber tire, as defined in claim 1, wherein said wear indicator includes colored cord to make same visually distinguishable, white cord being considered colored.

6. The rubber tire, as defined in claim 1, wherein said wear indicator is essentially planar, the thickness of same relative to the length of said arms and back being small, and said wear indicator is disposed at spaced-apart positions around the periphery of said tire.

7. The rubber tire, as defined in claim 6, wherein the plane of said essentially-planar wear indicator is parallel to the axis of said tire.

8. The rubber tire, as defined in claim 6, wherein the plane of said essentially-planar wear indicator is perpendicular to the axis of said tire.

9. The rubber tire, as defined in claim 6, wherein said indicator is disposed at spaced-apart positions across the periphery of said tire, that is, in a direction parallel to the axis of said tire.

10. The rubber tire, as defined in claim 1, wherein the component included between the arms of said letter is visually distinguishable from the component included in said back of said letter.

* * * * *